United States Patent Office 3,508,657
Patented Apr. 28, 1970

3,508,657
HIGH PRESSURE FILTER ASSEMBLY HAVING AN EASILY DETACHABLE BOWL COVER
Roydon B. Cooper, Locust Valley, N.Y., assignor to Pall Corporation, Glen Cove, N.Y., a corporation of New York
Filed Apr. 29, 1968, Ser. No. 725,034
Int. Cl. B01d 23/26, 27/08
U.S. Cl. 210—90                              19 Claims

ABSTRACT OF THE DISCLOSURE

A filter assembly is provided in which the bowl cover of the housing is easily detachable from the bowl but tightly seals thereagainst. The bowl cover has a rotatable coupling lever attached thereto. The coupling lever threadedly engages the threaded end of a support pipe in the bowl portion, and upon rotation of the lever, the head portion is either drawn onto or pulled away from the bowl portion depending upon the direction of rotation. A sealing ring is positioned between the cover and the support pipe to form a seal interiorly of the threaded portion of the support pipe so as to form a seal between the cover and the bowl via the support pipe and at the same time isolate the coupling mechanism from flow through the assembly.

---

This invention relates to a filter assembly in which the bowl cover of the filter housing is easily removable from the bowl, by rotation of a coupling lever attached to the head portion. The head tightly seals at its periphery against the bowl portion and seals centrally against a support pipe in the bowl portion such that no leakage can occur even under extremely high pressures.

In many filter assemblies with removable bowls used in industrial filtering operations in which the filter is subjected to high line pressures of the order of up to 2000 p.s.i. or more, the filter housing must be constructed in a manner such that the head portion is quite tightly and securely held to the bowl portion and firmly bears against the filter element in order to prevent both external and internal leakage. Normally, compression seals or other sealing members are provided between the tightly joined mating sections of the housing and between the housing sections and the filter element to assist in preventing leakage.

Often, however, due to the tight engagement between the parts of the assembly and the expansion of the sealing members caused by the internal pressure of the system, it is extremely difficult to remove the head portion from the bowl portion to replace the filter element when it becomes clogged with contaminants. It is necessary with such assemblies to employ wrenches and hammers to break the tight seal between the filter housing head and the bowl portion of the filter assembly portion. Such a procedure is time-consuming and hard on the equipment. It can be extremely costly, if it is slow, since it is normally necessary to shut down the operation of the fluid system in which the filter is used while the filter cartridge is replaced. If several such filter assemblies are used in the fluid system, the delay due to the replacement of each filter cartridge can become a significant cost factor.

Another drawback of such conventional filter assemblies requiring tools for disassembly is that due to the use of tools, it is quite difficult to avoid contaminating the fluid system with small particulate material either created by the abrasion of tools bearing against the housing or carried with the tools and accidentally introduced into the system as the filter cartridge is replaced. In addition, in such assemblies the abrasive contact between the housing parts and sealing members can generate contaminant particles which can enter the fluid system. Such contaminants eventually build up in the system and can cause abrasion and wear, and blockage of the components of the system.

One solution to the problem of removing the housing cover from the bowl of the filter assembly is to provide a self-securing and self-removing coupling mechanism as a portion of the housing assembly. Such coupling mechanisms are normally provided with a handle or a lever to facilitate the coupling and uncoupling of the cover to the bowl portion. Filter assemblies having such coupling members are shown in U.S. Patents Nos. 3,317,053 to Dummler; 2,218,800 to Williams; 2,533,192 to Kennedy and 2,747,738 to Johnson et al. These patents disclose filter assemblies in which a rotatable coupling handle is provided on the head portion or cover of the housing. The handles are adapted to both tighten the head or cover on the bowl when rotated in one direction and pull the head from the bowl when rotated in the opposite direction.

In all of the filter assemblies shown, the coupling handle mechanism extends into the interior of the housing and in most instances a seal is provided between the head or cover and the rotatable handle to prevent leakage through or at the coupling handle mechanism. The difficulty with these filter assemblies having coupling mechanisms of the type described above and shown in the patents referred to above, is that due to the fact that one of the members against which a seal to be formed is a rotatable member, wear of the seal is rapid and it is extremely difficult to provide a tight seal under the high fluid pressures that are required in many industrial fluid systems since leakage can occur at or through the coupling mechanism. Moreover, in the filter assemblies shown in these patents, the act of loosening and tightening the housing cover onto the bowl portion can cause wear of the sealing members and the housing and generate contaminant particles which enter the fluid system since the coupling mechanism extends in the interior of the housing.

The instant invention overcomes these problems by providing the filter assembly adapted for use under extremely high pressures of the order up to 2000 p.s.i. or more and having a coupling mechanism adapted to couple and remove the filter housing cover from the bowl portion in which the coupling mechanism is isolated from the fluid in the housing by an interior seal between the housing head and a support post in the bowl. Due to this construction, leakage from the assembly at or through the coupling mechanism cannot occur. Moreover, the operation of the coupling mechanism does not cause any significant wear of the sealing member since the coupling mechanism does not contact the sealing members and no rotational contact against the sealing members occurs.

The filter assembly of the invention comprises a housing having an inlet, an outlet, an open bowl, and a bowl cover; a filter element in the bowl across the line of flow between the inlet and the outlet, such that normally flow from the inlet to the outlet proceeds through the filter; a cover support assembly fixed in the bowl and having coupling means at one end; a coupling lever movably mounted on the cover and removably engaging the coupling means to fasten the cover to the support so that the support assembly and the cover in cooperation close off the open end of the bowl, said coupling lever and coupling means being operatively associated such that movement of the coupling lever in one direction draws the cover onto the bowl, and movement of the coupling lever in another direction separates the bowl and cover without rotation of the cover or bowl;

and sealing means positioned between the support assembly and the head portion of the housing interiorly of the coupling means so as to form a seal between the cover and the bowl via the support post assembly, at the same time isolating the coupling means and coupling member from the fluid passing through the assembly from the inlet to the outlet. The sealing means is free from contact by any rotatable member and thus, is not subject to wear caused by such contact.

IN THE DRAWINGS

Figure 1:
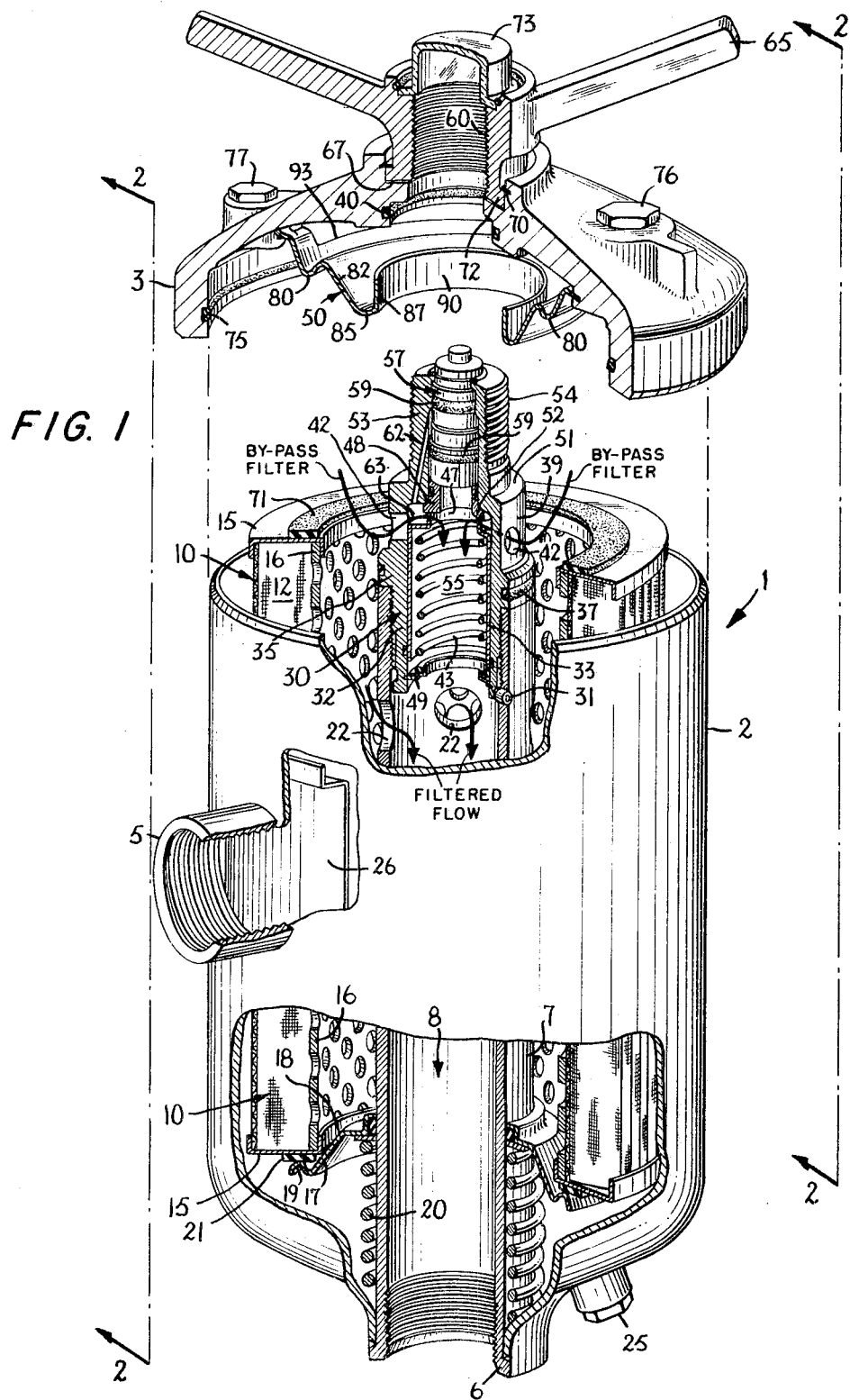
FIGURE 1 is an exploded view partially in section and partially broken away, of a filter assembly in accordance with this invention.
Figure 2:
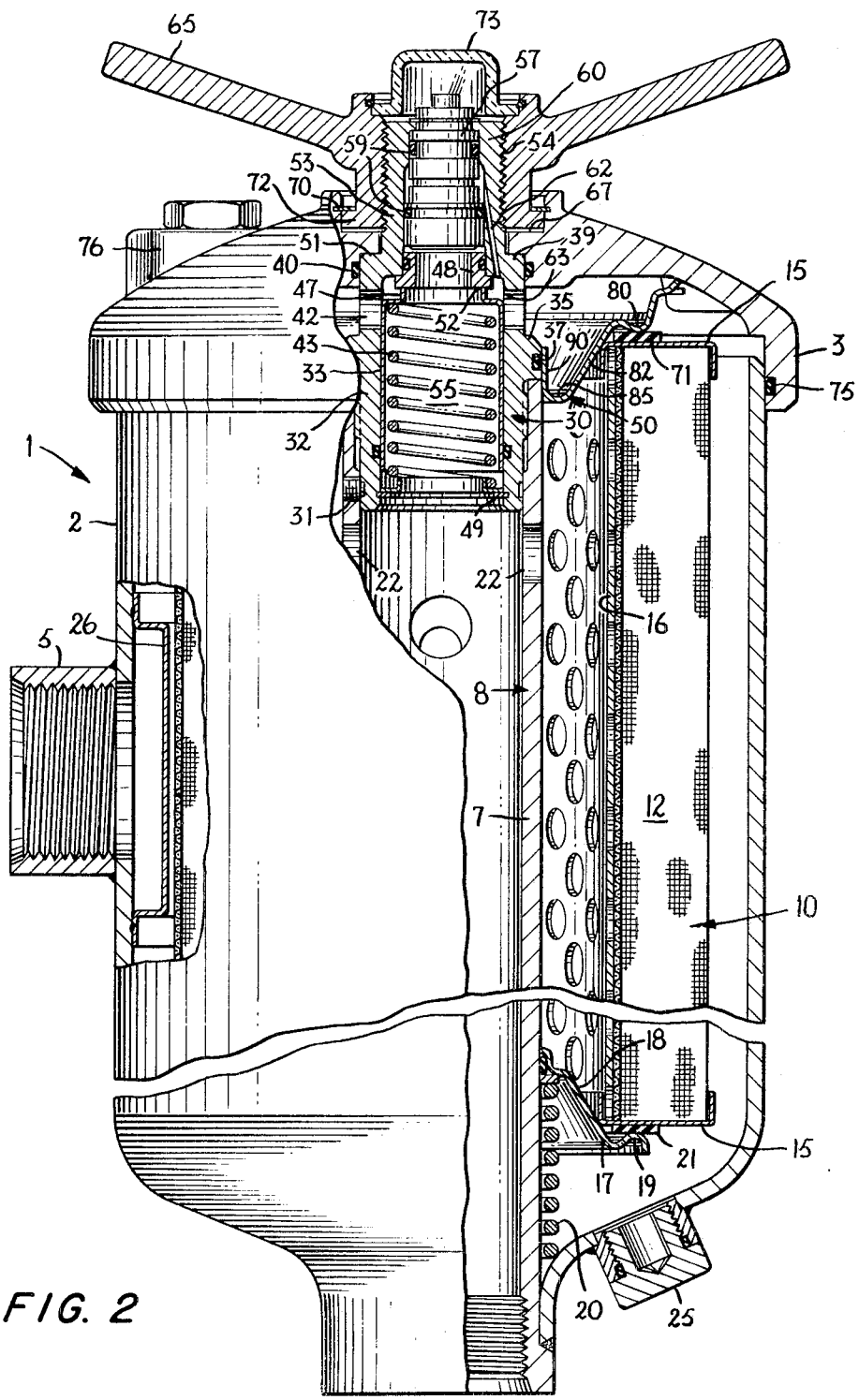
FIGURE 2 is a partial cross-sectional view of the filter assembly taken along the line 2—2 of FIGURE 1.

The filter assembly 1 shown in FIGURES 1 and 2 has a bowl 2 and a cover 3. The bowl 2 is formed with an inlet 5. A baffle plate 26 is provided adjacent the inlet 5, to intercept and distribute fluid from the inlet within the bowl. An outlet 6 is formed at the bottom of the bowl on a support pipe assembly 8 disposed centrally in the bowl portion and longitudinally thereof. The support assembly 8 can be a pipe (as shown), a post, or other support member. The central pipe 7 of the support pipe assembly 8 can be welded, swaged or otherwise bonded in a fluid tight seal to an opening in the bowl portion 2 of the housing. A drain port 25 is provided at the base of the filter bowl to enable the liquid present in the bowl to be drained when desired. The bowl portion 2, the cover 3 and the support assembly 8 can be made from any strong material such as steel, stainless steel, iron, aluminum, magnesium, nickel and nickel alloys. Strong plastic resinous materials such as melamine-formaldehyde resin, polycarbonates, polystyrene, polyester, nylon, Teflon and phenol-formaldehyde resin can also be used.

A filter element 10 is disposed within the bowl portion and about the central pipe 8.

The filter element comprises a cylindrical filter cartridge formed of a pleated stainless steel wire mesh sheet 12 held between end caps 15 and supported by a foraminous internal support core 16. The filter can be made from any filter sheet material. Examples of suitable metallic filter sheets are disclsed in U.S. Patent No. 2,925,650 to Pall and U.S. Patent No. 3,251,681 to Pall. Other metallic filter sheets made from brass, Monel, iron copper, aluminum, nickel and the like, can be used. These can have fibrous or particulate material bonded thereto. Nonmetallic filter sheets can also be used and can comprise any of the filter sheets known to those skilled in the art. Fibrous filter sheets made of materials such as paper, asbestos, paper-asbestos combinations, textile fibers, regenerated cellulose, microcrystalline cellulose, casein fibers, zein fibers, cellulose acetate, viscose rayon, hemp, jute, linen, cotton, silk, wool, mohair, glass, polyvinyl chloride, polystyrene, polyethylene, polypropylene, polyacrylonitrile, can be used. The fibrous filter sheet can be woven, or it can be non-woven, such as felt, mat or bat. The filter medium can also comprise a plurality of woven and/or non-woven layers, and can be resin-impregnated. The filter sheet can also comprise a fibrous or nonfibrous base upon which a fibrous and/or particulate layer is laid down. Examples are disclosed in U.S. Patents Nos. 3,158,532 to Pall et al.; 3,-246,767 to Pall et al.; and 3,238,056 to Pall. The instant filter assembly is particularly suited for use with fine particle removal filters such as those described in the patents noted immedately above since mechanisms described hereinafter are effective to prevent leakage of particles as small as 0.1µ.

The filter cartridge 10 is supported in the bowl portion on a generally conical annular flange 17 having a conical inner portion 18 and a flared outer portion 19. The conical flange 17 is disposed about the central pipe 7 and is urged upwardly and against the filter element 10 by a spring 20 disposed about the pipe 7 and between the flange 17 and the bottom of the filter bowl. The conical inner portion 18 centers the filter element 10 in the housing and the flared end 19 engages a sealing washer 21, which is disposed on the bottom end cap 15 to prevent fluid from bypassing the filter. The spring 20 biases the end 19 against the washer 21 to ensure that no leakage can occur. Moreover, the spring 20 and flange 17 are adapted to push the filter upwardly out of the bowl into an easily accessible position when the cover 3 is removed from the bowl 2. As an alternative to the conical plate support assembly described above a support such as shown in U.S. Patent No. 3,283,434 to Pall can be used.

The central pipe 7 is formed with a plurality of apertures 22 which receive filtered fluid passing to the output 6 from the filter element 10.

The upper portion of the support pipe assembly 8 comprises a combined coupling and valve assembly 30 which threadedly engages the top portion of the support pipe 7 and is held in position by a set screw 31. It is to be noted that, however, the coupling and valve assembly described hereinafter can be formed as a unitary member with the support pipe assembly 8 and need not be a separate insert. Furthermore, it is to be noted that the coupling and valve assembly described hereinafter can be formed as a unitary member with the support pipe assembly 8 and need not be a separate insert. Furthermore, it is to be noted that the coupling and valve assembly described represents a preferred embodiment of this invention in which a by-pass valve is provided to permit fluid to by-pass the filter element and proceed directly to the outlet 6 when the filter element becomes clogged. However, if a by-pass valve is not desired, the coupling assembly 30 need not incorporate a valve mechanism such as shown in FIGURES 1 and 2. The coupling and valve assembly 30 comprises a body portion 32 that is hollow and houses a slide valve sleeve 33. The body portion 32 is formed with a circumferential rim 35 about midway of its length. This rim 35 seats against the top most portion of the pipe 7. The rim 35 is of the same diameter as the pipe 7 and has an O-ring 37 sealing member that seals against a centering and sealing plate 50 in the cover 3 as can be seen in FIGURE 2 and as will be explained hereinafter. Above the rim 35, the body portion 32 is formed with a reentrant portion 39 of lesser diameter than the rim 35. This reentrant portion 39 forms a surface which seals against an O-ring seal 40 in the cover portion 3. As can be clearly seen by reference to FIGURE 2, the end of the coupling assembly 30 of the support assembly 8 protrudes through the cover portion 3 and the sealing ring 40 engages the surface 39 beneath the protruding portion. Thus, the O-ring seal 40 forms a seal between the support assembly 8 and the housing cover 3 interiorly of the coupling mechanism which isolates it from contact with the fluid in the assembly and prevents leakage from the assembly at this point. Therefore, if a corrosive fluid is being filtered, the coupling mechanism will not be damaged by the fluid. The seal 40 in addition, does not permit any particles generated by the coupling mechanism in the coupling and uncoupling of the head and bowl portions to enter the system. The O-ring seals 37 and 40 as shown are located on the support pipe assembly 8 and on cover 3 respectively. It is to be noted that the seal 37 can be located either on the rim 35 or on the plate 50 and the seal 40 can be located either on the surface of the reentrant portion 39 or in the cover 3. In either case the seals 37 and 40 do not contact and form a seal against a rotating member, since the cover and the support assembly do not rotate when brought together or separated by the coupling mechanism. Thus, there is no wear due to a rotatable member being tightened against a seal or abrading its surface upon coupling and uncoupling of the bowl and cover. It is to be further noted that the sealing means can be formed integrally with the support pipe assembly, the housing portions, and the other portions of the assembly that abut in a sealing relationship. This can be conveniently done when such portions of the assembly are made of a plastic material. Preferably the external seals, 40 and 75 described hereinafter i.e., seals that are subjected to the pressure differential between the fluid line pressure and the atmosphere, employed herein are radial seals. Such seals are preferred since they are not compressed in an amount that is dependent on the tightness of the cover on the bowl portion. Therefore, the pressure against which they can seal is independent of how tightly the cover is drawn against the bowl, and thus, they will seal tightly although the cover is not fully tightened. Moreover, such seals are not worn significantly in this assembly by the act of removing the head from the bowl portion since they are not contacted by a rotating member nor are they distorted to any significant extent by the high internal pressure in the system. A preferred radial seal is an O-ring seal. However, the seal can have any cross-sectional shape and can be ellipsoid, rectangular, V shaped, or the like. Other seals such as shown in U.S. Patent No. 3,093,581 to Pall et al. can also be used.

A plurality of apertures 42 are formed in the reentrant portion 39. These apertures are normally closed off internally of the body portion 32 by the coaxial poppet valve piston 33. The poppet valve piston 33 has an upper portion that is turned inwardly and is formed with a lip 47. The lip 47 is normally biased against a valve seat 52 formed on an insert 48 by a spring 43 disposed within the poppet valve piston 33. The spring 43 is supported in the body portion 32 by an annular flanged rim 49 mounted in the body portion 32.

The valve structure described above is only one of the several types of valves that can be used. A valve formed of a Belleville spring disk such as shown in U.S. Patent No. 3,262,567 to Pall et al. is also particularly suitable as the relief valve. Slide valves, flap valves, and the like are also suitable.

The body portion 32 of the coupling valve assembly is formed with a ledge 51 and a second reentrant portion 53 above the reentrant portion 39. The second reentrant portion 53 is formed with threads 54 adapted to engage a mating threaded coupling lever 60 mounted on the cover portion 3 when the filter housing cover 3 is assembled onto the bowl portion 2 as can be seen in FIGURE 2. The threaded portion of the lever 60 comprises a coupling nut that is centrally disposed on the cover portion 3 and is rotatably mounted in a recess 67 formed on the top of the filter housing cover 3. The rotatable coupling lever 60 is retained in the recess 67 against displacement from the cover portion 3 by a retainer ring 70 which is mounted in the head and captures a flange 72 on the end of the coupling lever 60. Thus, the threaded coupling lever 60 is mounted on the cover portion 3 in a rotatable manner, but is fixed against displacement from the cover portion 3 by the retainer ring 70. Therefore, when the coupling lever 60 and the threaded end of the coupling and valve assembly 30 are brought together and the lever handle 65 is rotated, the cover is drawn onto the open end of the bowl. When the lever handle 65 is rotated in the opposite direction, the cover and bowl are pulled apart. Both the drawing together and the pulling apart of the cover and bowl are accomplished without rotation of either the cover or bowl. The upper portion of the coupling lever 60 is provided with a transparent glass cap 73 through which an indicator 57 as described below can be viewed to determine whether or not the filter is clogged. The cap 73 also prevents the entry of dirt into the coupling mechanism and ensures that the indicator described below cannot be reset without the cover 3 being removed. The threads 54 and the threaded coupling lever 60 as described above comprise the preferred coupling mechanism for moving the cover and bowl into engagement and separating them when the filter cartridge is to be replaced. The threaded engagement is preferred since it provides a high mechanical advantage especially if a large lever handle 65 is used on the coupling lever 60. Moreover, by employing a threaded coupling mechanism and O-ring seals, an extremely high pressure seal, that is not difficult to break when desired, can be obtained since O-rings provide a high fluid pressure seal that can be broken quite conveniently by the gradual but firm pull of the threaded coupling lever which slides the sealing ring along the sleeving surface until the head and bowl are separated. Additionally, O-ring seals can be reused.

Other coupling levers and mechanisms can also be used. One such coupling mechanism can be a bayonet coupling between the head and support assembly in which one of the coupling members has a coupling pin and the other has a track in which the pin moves into and out of locking positions. If it is desired to provide additional force to break the seal and move the cover into and out of position, the bayonet coupling member on the cover can be provided with pivoted, cam action lever arms to engage the support assembly and move the cover relative to the support assembly.

A differential pressure indicator 57 of the type described in U.S. Patent No. 2,943,572 is supported in and closes off the top of the open central passage 55 of the coupling valve assembly 30. Leakage of fluid from the central passage 55 between the inner wall of the re-entrant portion 53 and the differential pressure indicator 57 is prevented by two O-ring seals 59. The downstream side of the indicator communicates with the outlet via the central passage 55 of the body portion 32 through the insert 48. The upstream side of the indicator communicates with the upstream side of the filter via a bore 62 in the wall of the reentrant portion 53. This bore 62 taps fluid pressure at the apertures 42 in the reentrant portion 39 via a small space 63 defined between the valve seat 52, the lip 47 of the poppet valve 33, and the inner wall of the body portion 32.

The cover portion 3 has a port 76 normally closed off by a bolt through which the assembly can be initially filled with liquid; a vent port 77 is also provided through which any air or other gas tapped in the filter assembly can be vented when the assembly is filled.

An O-ring seal 75 is located at the periphery of the cover portion 3 and is adapted to engage the exterior of the bowl portion 2 when the cover portion is fitted onto the bowl portion of the filter.

The positioning and sealing member 50 is preferably in the form of a generally conical and convoluted plate. The plate is loosely mounted centrally on the cover portion 3 to engage and center the filter element within the housing. The plate 50 also seals against the filter element 1 and the support pipe assembly 8 to prevent leakage of unfiltered fluid from the assembly through the outlet. The conical plate 50 is formed with a first convolution 80 which seals against a washer-like sealing element 71 on the top end cap 15 of the filter element. Proceeding inwardly and downwardly from the convolution 80 is a positioning surface 82 adapted to center the filter element 10 in position when the head is drawn onto the bowl portion. This surface 82 defines one side of a second convolution 85 the other side of which 87 defines an annulus having a sealing surface 90 adapted to seal against the O-ring 37 on the rim 35 of the coupling and valve assembly 30. The plate 50 is also formed with a peripheral slot 93 which communicates the upstream side of the filter 10 with the apertures 42 in the valve and coupling assembly 30.

In order to assemble the filter assembly, a filter cartridge 10 is inserted into the bowl portion 2 of the filter assembly and the cover portion 3 is placed on the bowl portion with the peripehral sealing ring 75 contacting the exterior of the bowl 2. In this position, the topmost portion of the threaded end 53 of the coupling and valve assembly 30 abuts the bottom of the rotatable coupling member 60 on the cover portion 3. Clockwise rotation of the lever handle 65 results in the threaded engagement of the coupling lever 60 and the coupling assembly 30 thereby drawing a housing cover 3 onto the bowl portion 2 of the assembly. Further rotation of the lever handle 65 brings the positioning surface 82 into contact with the central opening of the filter cartridge and the convolution 80 of the plate 50 into contact with the sealing washer 82 on the filter element 12 to bring filter element 12 into proper axial alignment and seal it within the housing. At the same time, the positioning and sealing plate 17 seals and aligns the bottom of the filter element. Concurrently therewith, the sealing surface 90 of the plate 50 engages the O-ring 37 and forms a seal thereagainst and the sealing ring 40 is brought into a contact with the surface of the reentrant portion 39 thereby sealing the head portion 3 to the support pipe assembly 8.

In operation, fluid entering the housing from the inlet 5 passes into the bowl portion of the housing and contacts the upstream surface of the filter element 12. Fluid passes through the filter element, is filtered, and thence passes through the apertures 22 of the support of the pipe 8 to the outlet 6. Fluid communication also occurs from the upstream side of the filter 12 through the slot 93 in the plate 50 to the apertures 42 in the coupling valve assembly 30. The aperture 42, however, are closed off by the valve 33. The sealing ring 40 prevents leakage from the assembly through the coupling mechanism and the sealing ring 37 prevents leakage to the downstream side of the filter. The space above the plate 50 is closed and thus, no flow proceeds through it.

As the filter element 10 becomes clogged with contaminants, the pressure differential between the upstream surface of the filter and the outlet increases. When the force acting on the poppet valve 33 due to the increased pressure differential becomes greater than the force of the spring 43, the valve 33 will move away from the seat 52 and permit fluid to pass through the apertures 42 to the outlet 6, thus, bypassing the filter. The indicator 57 is set to actuate at or just below the pressure differential required to open the valve. It is to be noted that the pressure indicator 57 is exposed to the same pressure differential as is the valve 33 due to the fact that the outlet pressure communicates with the downstream side of the indicator via the central passage 55 while the upstream side of the indicator is exposed to the upstream pressure through the bore 62 and the space 63. Signaling of the indicator can be visually observed through the transparent cap 73 on the rotatable coupling lever 60.

To remove the clogged filter cartridge it is merely necessary to rotate the lever handle 65 of the coupling lever 60 in a counterclockwise direction. This in turn pulls the cover portion 3 from the bowl portion 2 quite easily.

It is to be noted that in the above assembly the rotatable threaded coupling lever 60 is completely isolated from contact with the fluid due to the positioning of the sealing ring 40. Moreover, rotation of the handle lever 65, and the coupling lever 60, causes no rotational frictional contact on any sealing member in the assembly. This means that the seals are not subjected to significant wear due to the removal of the head and bowl portions.

Thus, the instant filter assembly provides a convenient and rapid mechanism for removing a filter housing head in an efficient manner and without causing wear of the sealing elements and without the possibility of leakage occurring through the coupling mechanism.

Having regard to the foregoing disclosure, the following is claimed as the inventive and patentable embodiments thereof:

1. A filter assembly comprising, in combination, a housing having an inlet, an outlet, an open bowl, and a bowl cover; a filter element in the bowl across the line of flow between the inlet and the outlet, such that normally flow from the inlet to the outlet proceeds through the filter; a cover support post assembly fixed in the bowl and having coupling means at one end; a coupling lever movably mounted on the cover and removably engaging the coupling means, to fasten the cover to the support, so that the support assembly and the cover in cooperation close off the open end of the bowl, said coupling lever and coupling means being operatively associated and having means associated therewith such that movement of the lever in one direction draws the cover onto the bowl and movement of the lever in another direction separates the bowl and cover without rotation of the cover or bowl; and sealing means positioned between the support post assembly and the cover interiorly of the coupling means so as to form a seal between the cover and the bowl via the support post assembly, at the same time isolating the coupling means and coupling lever from the fluid passing through the assembly from the inlet to the outlet.

2. A filter assembly in accordance with claim 1 in which the coupling lever is rotatably mounted on the cover and is adapted to threadedly engage the coupling means on the support post.

3. A filter assembly in accordance with claim 2 in which the support assembly comprises a centrally located support pipe having a threaded end which protrudes at least in part through the cover.

4. A filter assembly in accordance with claim 3 including an aperture in said pipe communicating with the upstream side of the filter; and a relief valve located in said pipe in position to normally close off the aperture.

5. A filter assembly in accordance with claim 2 in which the coupling means on the support assembly is enclosed by the coupling lever.

6. A filter assembly in accordance with claim 1 in which the coupling lever is mounted in a recess in the cover.

7. A filter assembly in accordance with claim 1 in which the sealing means is an O-ring sealing member.

8. A filter assembly in accordance with claim 1 in which the cover has mounted thereon a generally conical positioning and sealing member disposed to engage the supporting assembly in a sealing relationship and form a seal against and engage the filter element to position and seal it in the assembly.

9. A filter assembly in accordance with claim 1 including a passage connecting the inlet and the outlet and bypassing the filter element; and a relief valve in said bypass passage normally closing off flow in said passage but responsive to a predetermined pressure differential across the filter element to open and permit flow to proceed to the outlet bypassing the filter element.

10. A filter assembly in accordance with claim 9 in which the valve is a poppet valve.

11. A filter assembly in accordance with claim 1 in which the sealing means is positioned to radially engage the support assembly and the cover.

12. A filter assembly in accordance with claim 1 in which the coupling lever is provided with a transparent cap, and in which a pressure differential indicator is disposed within the coupling means on the support post and in a position so as to be visible through the transparent cap.

13. A filter assembly in accordance with claim 1 including a lever handle on the coupling lever.

14. A filter assembly comprising, in combination, a housing having an open bowl and a cover; an inlet in one of the cover and the bowl; an outlet in one of the cover and the bowl; a cover support pipe assembly communicating with the outlet and fixed centrally in and longitudinally through the bowl and having a threaded end extending from the bowl portion and protruding at least in part through the cover; a generally cylindrical filter element disposed in the bowl about the support pipe and in the line of flow between the inlet and the outlet such that all flow normally proceeds through the filter element; lower positioning and sealing means in the bowl for positioning the filter element in the bowl relative to the support pipe assembly and sealing the filter element against the leakage at one end thereof; upper positioning and sealing means fixed to the cover of the housing and located to engage and position the filter element relative to the support pipe assembly and seal the filter element in the housing against leakage at the other end thereof, said upper positioning and sealing means also engaging and sealing against the support pipe assembly; at least one aperture in the support pipe assembly disposed between the upper and lower positioning and sealing means to receive filtered flow from the filter element and permit such flow to pass to the outlet; at least one upper aperture in the support post pipe assembly disposed above said upper positioning and sealing means and communicating with the inlet; a relief valve associated with said upper aperture and normally closing off said upper aperture to prevent fluid from bypassing said filter but responsive to a predetermined pressure differential between the inlet and the outlet to open and permit flow to bypass the filter; a threaded coupling lever rotatably mounted on the cover, said coupling lever positioned to removably engage the threaded end of the support pipe assembly to fasten the cover to the support pipe so that the support pipe and cover in cooperation close off the open end of the bowl and said coupling lever and threaded end of the support pipe being operatively associated with each other and having means associated therewith such that rotation of the coupling lever in one direction draws the cover onto the bowl portion and rotation of the coupling lever in the opposite direction separates the cover and the bowl without rotation of the bowl or the cover; sealing means positioned to engage the support pipe assembly between said upper aperture and the threaded end, and engaging the cover to form a seal between the cover and the bowl via the support pipe assembly interiorly of the coupling lever and at the same time isolating said threaded end and the coupling lever from the flow through the assembly; and peripheral sealing means disposed between the head portion and the bowl to prevent leakage there between.

15. A filter assembly in accordance with claim 14 in which the valve means is a poppet valve.

16. A filter assembly in accordance with claim 14 in which the peripheral sealing means between the cover and the bowl and the sealing means between the support pipe and the cover are O-ring sealing members.

17. A filter assembly in accordance with claim 14 in which the upper positioning and sealing means is a plate having a peripheral opening.

18. A filter assembly in accordance with claim 14 including a differential pressure indicator mounted in the end of the support pipe assembly.

19. A filter assembly in accordance with claim 18 including a transparent cap on the coupling lever through which the indicator can be viewed.

References Cited

UNITED STATES PATENTS

| 2,533,192 | 12/1950 | Kennedy | 210—442 |
| 2,747,738 | 5/1956 | Johnson et al. | 210—130 |
| 3,368,680 | 2/1968 | Bozek | 210—90 |

SAMIH N. ZAHARNA, Primary Examiner

U.S. Cl. X.R.

210—95, 130, 442, 232

UNITED STATES PATENT OFFICE
CERTIFICATE OF CORRECTION

Patent No. 3,508,657      Dated April 28, 1970

Inventor(s) Roydon B. Cooper

It is certified that error appears in the above-identified patent and that said Letters Patent are hereby corrected as shown below:

Column 2, line 61, "theinlet" should be -- the inlet --.
Column 3, line 47, "3,251,681" should be -- 3,241,681 --.
Column 4, lines 27 to 30, "Furthermore, ... insert." should be deleted.
Column 6, line 46, "tapped" should be -- trapped --.
Column 7, line 1, "peripehral" should be -- peripheral --.
Column 7, line 30, "aperture" should be -- apertures --.

SIGNED AND SEALED
OCT 20 1970

(SEAL)
Attest:

Edward M. Fletcher, Jr.
Attesting Officer

WILLIAM E. SCHUYLER, JR.
Commissioner of Patents